L. J. DAFT.
SPEED INDICATOR AND RECORDER.
APPLICATION FILED JULY 28, 1914.
1,175,050.
Patented Mar. 14, 1916.
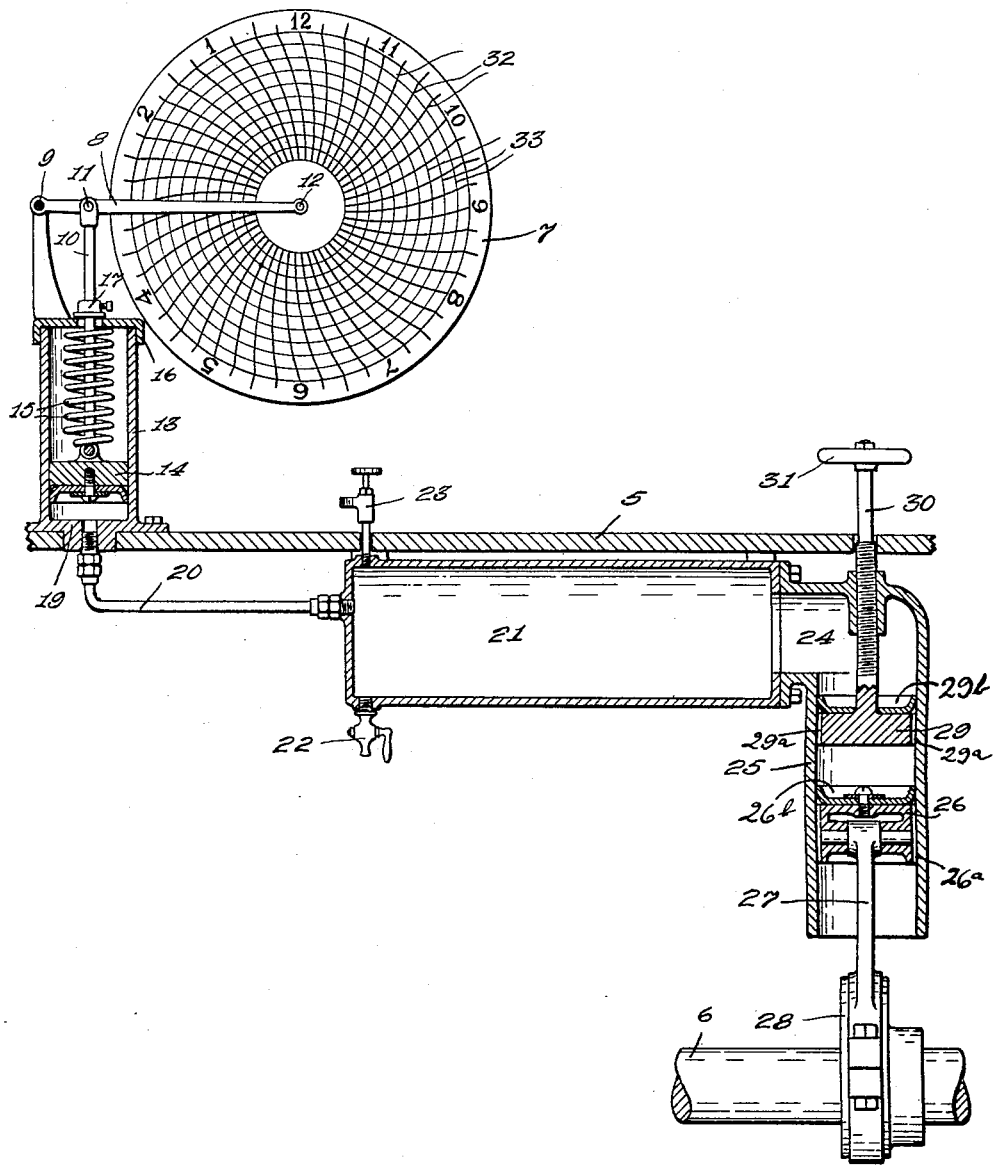
WITNESSES:
F. C. Matheny
A. Haskins
INVENTOR
Longfellow J. Daft
BY
C. D. Haskins
ATTORNEY

UNITED STATES PATENT OFFICE.

LONGFELLOW J. DAFT, OF ISSAQUAH, WASHINGTON.

SPEED INDICATOR AND RECORDER.

1,175,050.  Specification of Letters Patent.  Patented Mar. 14, 1916.

Application filed July 28, 1914. Serial No. 853,757.

*To all whom it may concern:*

Be it known that I, LONGFELLOW J. DAFT, citizen of the United States, residing at Issaquah, in the county of King and State of Washington, have invented a certain new and useful Improvement in Speed Indicators and Recorders, of which the following is a specification.

My invention relates to improvements in speed indicators or speed recorders and is designed particularly for use in connection with automobiles or motor vehicles, although obviously it may be adapted for use in connection with other vehicles or with moving parts of machinery where an accurate time record of the speed of movement is to be kept.

The objects of my invention are to provide an air controlled and air operated speed indicator that is connected with a moving dial in such a manner that an accurate diagrammatic record of the movement of the associated vehicle or mechanism with respect to time will be preserved on such dial and further to provide simple and efficient means for compressing the air that operates such speed indicator. I accomplish these objects by devices illustrated in the accompanying drawings in which the figure is a view partly in vertical section and partly in side elevation of a speed indicator and recorder embodying my invention as it may appear when it is associated with a motor vehicle, a fragment only of which vehicle is shown.

For the purpose of preserving a record of the time during which a motor vehicle travels and the speed at which such vehicle may be traveling at any instant during such time I have provided a speed indicator and recorder that may be described by reference to the accompanying drawings wherein the numeral 5 indicates a portion of the floor of a motor vehicle and 6 is a driving shaft that is connected with the wheels (not shown) of such motor vehicle in such manner that its rotation will have a fixed relation to the speed of the vehicle.

A dial-plate 7 is faced with an arbitrarily marked paper dial and is adapted to be revolved by clock work (not shown) and 8 is a pointer arm that is mounted on a pivot 9 and articulated with a piston rod 10 by a pin 11 at a short distance from said pivot 9, such pointer arm 8 being of sufficient length to reach to the center of the dial-plate 7 and there provided with a pencil 12 which, when the vehicle is at rest, will be positioned in the exact center of the dial-plate 7, but when such pointer arm 8 is moved in response to a movement of the piston rod 10 then such pencil 12 is adapted to be carried from its central position by such pointer arm 8 to drag on the paper dial to leave a mark thereon.

The piston rod 10 extends downwardly into a cylinder 13 and has its lower end secured to a piston 14 that is adapted to move upwardly and downwardly within such cylinder 13, a downward pressure being constantly exerted on the piston 14 by a compression spring 15 which bears one end against such piston and its other end against a cap 16 that is provided on the top of the cylinder 13. A collar 17 is provided on the piston rod 10 to stop such piston 14 at a desired point in its downward movement whereby the pencil point 12 may be brought to rest in the center of the paper-dial when no upward pressure is exerted on the piston 14.

The cylinder 13 is provided with an air tight bottom 19 into which is threaded an air pipe 20 that is adapted to conduct air under pressure from a tank 21 into the space between the bottom 19 and the piston 14 to lift such piston and move the pointer arm 8 over the paper-dial to cause the pencil point 12 to make a mark on said paper-dial.

The tank 21 is provided with a stop-cock 22 on its bottom side and with an air valve 23 on its top side and has its outer end connected by a passageway 24 with a pump cylinder 25 within which is disposed a piston 26 that is connected by a connecting rod 27 with an eccentric 28 that is provided on the driving shaft 6 of the vehicle whereby when such driving shaft 6 is rotated the piston 26 will be caused to reciprocate within the cylinder 25 to compress air in the tank 21, the amount of such air that is forced into the tank 21 at each stroke of the piston 26 being regulated by an adjustable cylinder head 29 which serves as a valve between the cylinder 25 and the tank 21 such cylinder head 29 being secured to a threaded stem or shaft 30 that extends upwardly through the wall of the passageway 24 and is provided on its top end with a handwheel 31 by which it may be turned to raise or lower the cylindrical head 29 within the cylinder 25.

The cylinder head 29 is provided in its periphery with longitudinal ports 29$^a$, and seated upon the top of the head is a flexible valve 29$^b$ dished upward, so that air pressure will cause the valve to lift and permit air to escape through the passageway 24 to the tank 21.

The piston 26 is provided with similar peripheral longitudinal ports 26$^a$ and has combined with it an upward dished valve 26$^b$ which will yield on the downward movement of the piston 26 and permit air to escape into the space between the head 29 and piston 26. By this arrangement it will be seen that the reciprocations of the piston 26 will cause air to be supplied to the tank 21 from which it is held against escape by the valve 29$^b$.

The paper-dial on the dial-plate 7 may be marked out in any desired manner but for the purpose of illustration I have shown it divided into units of time by curved radial lines 32 and into units representing speed by circular lines 33, the distance between adjacent curved radial lines 32 representing an interval of time of fifteen minutes and the distance between adjacent concentric circular lines 33 may represent a variation of speed of two miles per hour; but obviously these graduations may be changed to suit the special conditions under which the speed indicator and recorder is working.

The movement of the pointer arm 8 over the paper-dial is governed by the pressure of the air in the air tank 21 and the pressure of the air in such tank is governed by the speed of rotation of the shaft 6 and by the air valve 23. Thus when the shaft 6 is rotated at a certain speed, to cause the auto vehicle with which it is associated to travel at a certain speed, air will be compressed in the tank to a certain degree of pressure, the air valve 23 being regulated to permit the escape of such air sufficiently fast to prevent the pressure in the tank varying unless the rotary velocity of the shaft 6 is raised to cause air to enter the tank 21 at a greater or lesser rate, and the tank 21 being connected with the cylinder 13 by the pipe 20, air pressure from the tank 21 is communicated to the space below the piston 14 to lift such piston 14 against the pressure of the spring 15 to cause the pointer arm 8 to move the pencil 12 over the paper-dial to register the speed at which the vehicle travels at any instant of time, the curved lines 32 on the paper-dial being drawn with a radius of a length equal to their distance from the pivot 9 to the center of the dial-plate 7 whereby when the arm 8 moves outwardly the pencil point 12 will move parallel to said lines 32.

The dial-plate 7 herein illustrated is adapted by suitable clock work (not shown) to make one complete revolution in twelve hours and the mark of the pencil 12 on the paper-dial constitutes an accurate time record of the rate of speed at which the car has traveled at any hour or fraction of an hour during that twelve hours. If, for instance, the dial-plate with its paper-dial is set in motion at 12 o'clock and the car with which it is associated is started immediately and driven at a given speed for half an hour then the record on the paper-dial will show by the mark of the pencil 12 that from 12 o'clock to 12.30, the car moved at such certain speed, and if the car was then stopped the pointer would return to the position shown in the drawing and the record would show a stop.

The cylinder head 29 may be adjusted vertically in the cylinder 25 by grasping the handwheel 31 and screwing the stem 30 up or down in the cylinder 25 to vary its distance from the piston 26. Thus when it is desired that more air shall be pumped into the tank 21 at each stroke of the piston the adjustable head 29 is moved downwardly toward the piston 26 so that a smaller clearance space will be left between the head 29 and the piston 26 when the piston 26 is at the end of its compression stroke, and if it be desired that less air shall be pumped into tank 21 on each stroke of the piston then the adjustable head 29 is moved farther away from the piston 26 to leave a larger space between such head 29 and piston 26 at the end of the compression stroke of said piston.

The stop-cock 22 is normally adapted to be closed but may be opened for the purpose of draining the tank 21 if water should collect therein or of quickly relieving the pressure, and the air valve 23 may be so regulated that it will relieve the air pressure within such tank fast enough when the pump is working to cause the pointer arm 8 always to register the correct number of miles per hour.

Manifestly numerous changes in the various details embodied in my speed indicator and recorder may be resorted to without departing from the spirit of my invention or sacrificing any of its advantages.

What I claim is:

In a speed indicator and recorder, a revoluble shaft, a pump operable by the revolution of the shaft to compress air, a tank to receive the air when compressed, a revoluble indicator disk carrier, a cylinder, a piston in said cylinder, a pencil carrying arm operatively connected with said piston, a spring normally urging said piston in one direction, and a pipe connecting the tank and cylinder whereby to force said piston against the action of said spring.

In witness whereof, I hereunto subscribe my name this 16th day of July, A. D. 1914.

LONGFELLOW J. DAFT.

Witnesses:
J. H. GIBSON,
MASON CRITTS.

Copies of this patent may be obtained for five cents each, by addressing the "Commissioner of Patents, Washington, D. C."